(12) United States Patent
Fallet

(10) Patent No.: US 8,842,744 B2
(45) Date of Patent: Sep. 23, 2014

(54) SYSTEM FOR COMMUNICATING OVER A POWER CABLE

(75) Inventor: Truls Fallet, Oslo (NO)

(73) Assignee: Badger Explorer ASA, Stavanger (NO)

(*) Notice: Subject to any disclaimer, the term of this patent is extended or adjusted under 35 U.S.C. 154(b) by 143 days.

(21) Appl. No.: 13/502,443

(22) PCT Filed: Oct. 19, 2010

(86) PCT No.: PCT/EP2010/065709
§ 371 (c)(1),
(2), (4) Date: Jun. 28, 2012

(87) PCT Pub. No.: WO2011/048090
PCT Pub. Date: Apr. 28, 2011

(65) Prior Publication Data
US 2012/0263243 A1    Oct. 18, 2012

(51) Int. Cl.
*H04B 3/00* (2006.01)
*H04B 14/02* (2006.01)
*H04B 3/54* (2006.01)
*E21B 47/12* (2012.01)

(52) U.S. Cl.
CPC .............. *H04B 3/548* (2013.01); *H04B 14/023* (2013.01); *E21B 47/12* (2013.01); *H04B 2203/5475* (2013.01)
USPC ......................................... 375/258; 116/250

(58) Field of Classification Search
USPC .................................................... 166/250.01
See application file for complete search history.

(56) References Cited

U.S. PATENT DOCUMENTS

| | | | |
|---|---|---|---|
| 4,583,093 A | 4/1986 | Beals | |
| 4,995,058 A | 2/1991 | Byers et al. | |
| 5,172,717 A * | 12/1992 | Boyle et al. | 137/155 |
| 5,995,020 A * | 11/1999 | Owens et al. | 340/854.9 |
| 6,308,688 B1 * | 10/2001 | French et al. | 123/490 |
| 7,989,982 B2 * | 8/2011 | Saggini et al. | 307/77 |
| 2002/0036085 A1 * | 3/2002 | Bass et al. | 166/250.01 |
| 2007/0202839 A1 * | 8/2007 | Abraham et al. | 455/402 |
| 2007/0286305 A1 * | 12/2007 | Saggini et al. | 375/272 |
| 2008/0264633 A1 * | 10/2008 | Hudson | 166/250.01 |
| 2009/0321071 A1 * | 12/2009 | Zhang et al. | 166/250.01 |

FOREIGN PATENT DOCUMENTS

WO    01/53656 A1    7/2001

OTHER PUBLICATIONS

Norwegian Search Report for Patent application No. 20093173 dated May 15, 2010, (1 page).
International Search Report from PCT/EP2010/065709 dated Jan. 20, 2011 (2 pages).
Written Opinion from PCT/EP2010/065709 dated Jan. 20, 2011 (6 pages).
International Preliminary Report on Patentability from PCT/EP2010/065709 dated Jan. 11, 2011 (8 pages).
Response to Written Opinion from PCT/EP2010/065709 dated Sep. 23, 2011 (2 pages).

* cited by examiner

*Primary Examiner* — Santiago Garcia
(74) *Attorney, Agent, or Firm* — Osha Liang LLP

(57) ABSTRACT

A system for communicating over a power cable has a power line connected to a power source at one end, a switch mode transformer connected to the power line at the other end for transforming voltage received from the power source through the power line, modulation of the switch mode transformer, and a receiver situated at the power source end and adapted to detect and process ripple signals from the switch mode transformer propagated on the power line.

6 Claims, 3 Drawing Sheets

SYSTEM FOR COMMUNICATING OVER A POWER CABLE

BACKGROUND

1. Technical Field

The present invention regards a system for communicating over a power cable.

2. Background Art

There is in many situations a need for communication over large distances. Often, such communication needs coincides with a need for transferring power.

For example in petroleum wells there is a need for communication from topside to downhole for transferring control signals to downhole equipment and from downhole to topside, for example for transferring monitoring data from downhole equipment. In petroleum wells the distances are large and the power sources are often high voltage power sources.

Other examples of areas having communication needs are drilling operations for tunnels or wells, monitoring galleries in mines, etc.

Traditionally such communication has been based on dedicated cables or traditional modem technology. As there often are long distances through a rough environment and the power cable is radiating a lot of ripple noise, traditional modem technology often get problems. In hot environments optical fiber communication is not an issue due to limited performance of lasers at high temperature.

U.S. Pat. No. 5,995,020 regards a downhole power and communication system for operating a tool string in a well. The system comprises an apparatus for transmitting electricity between a downhole well tool and the well surface. A controller is located at the well surface, a receiver module is engaged with the well tool, and a conductor is connected to the controller and the receiver module. The controller may include a communication transmitter and a modulator operable to generate an electric signal representing at least two states and/or a data bit representing an address. The address is used to connect power to a desired tool.

US 2007/0202839 regards a method of transmitting data over a regular power line of a switch mode power supply system. The data are transmitted by frequency modulating the power signal. This method is not adapted for use in petroleum wells and the communication is from the power source to the power user only.

US2007/0286305 regards a transmitting apparatus of digital signals to a user on a line in which a supply signal of electronic devices is present. One embodiment comprises a switching converter and means for varying the switching frequency of the converter on the bases of a signal to be transmitted.

SUMMARY

One or more embodiments of the present invention provides a system for communicating from underground equipment over a power cable/line which utilizes the power transmission to the equipment to communicate from the equipment downhole to topside.

According to one or more embodiments of the present invention, the system for communicating over a power cable has a power line connected to a power source in one end, a switch mode transformer connected to the power line at another end for transforming the voltage received from the power source through the power line, modulation of the switch mode transformer, and a receiver adapted to receive and process signals from the switch mode transformer.

The power source is usually a high voltage power DC source in order to be able to transfer the power over large distances with as low loss as possible. The power source is a dc power source in one or more embodiments of the present invention.

The switch mode transformer is connected to the power line and transforms the voltage supplied by the power source to a more suitable voltage level for the equipment. The switch mode transformer is for example a dc-dc converter. In one or more embodiments of the present invention, the switch mode transformer is a switch mode inverter.

The switch mode transformer may be chosen and/or designed to optimize the switching frequency. Faster switching/higher frequency improves the maximum data rate and leads to less need of filtering of the signal. In one or more embodiments of the present invention, the switch mode transformer comprises silicon carbide transistors. Silicon carbide transistors are suited for operating at high power and high temperature levels. They have low resistance and thus lower power loss and permits fast switching.

The operation of the switch mode transformer will normally generate ripple on the power line which will propagate through the power line. The switching mode is controlled by the modulating means in order to use the ripple as carrier for data transfer. The switching is controlled in one or more embodiments of the present invention to generate ripple time series which contain data on a series format.

In one or more embodiments of the present invention, the system comprises a means for reducing ripple from the switch mode transformer, for example a filter. The filter may be connected to or integrated in the switch mode transformer. The filter may shape the ripple to a suitable transmission level, leaving a dc voltage having a certain amount of ripple.

The means for modulating the switch mode transformer may be any modulator suitable for controlling the switching of the switch mode transformer. The means for modulating the switch mode transformer can implement a number of modulation methods. In one or more embodiments of the present invention, the dc-component of the modulation signal is zero. This will ensure that the low voltage dc output from the switch mode transformer is not changed by the modulation.

Examples of modulation methods that may be implemented by the modulating means are bi-phase modulation and frequency shift modulation. Biphase modulation provides larger signal bandwidth and a switching duty factor of 50%. Frequency shift modulation can provide duty factors different from 50%, but has narrower signal bandwidth. Other modulation methods may also be used, such as for example two-tone frequency modulation. Two-tone frequency modulation, however allows lower bit rate.

The signals generated by the modulation of the switch mode transformer will propagate through the power line and be received by the receiver. The receiver comprises or is connected to means to process the signals. The processing may comprise transforming, demodulating and outputting the signal. The demodulation method will correspond to the modulation method.

In one or more embodiments of the present invention, the receiver comprises or is connected to a pulse transformer for isolating the signal of interest from the high voltage signal. The pulse transformer is in this case arranged prior to the demodulation means.

One or more embodiments of the present invention will now be described in more detail by means of examples and with reference to the accompanying figures.

DETAILED DESCRIPTION

Hereinafter, embodiments of the invention will be described with reference to the drawings. However, the present invention is not limited to sizes, materials, shapes, relative dispositions and the like of the components described in the following embodiments and examples. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
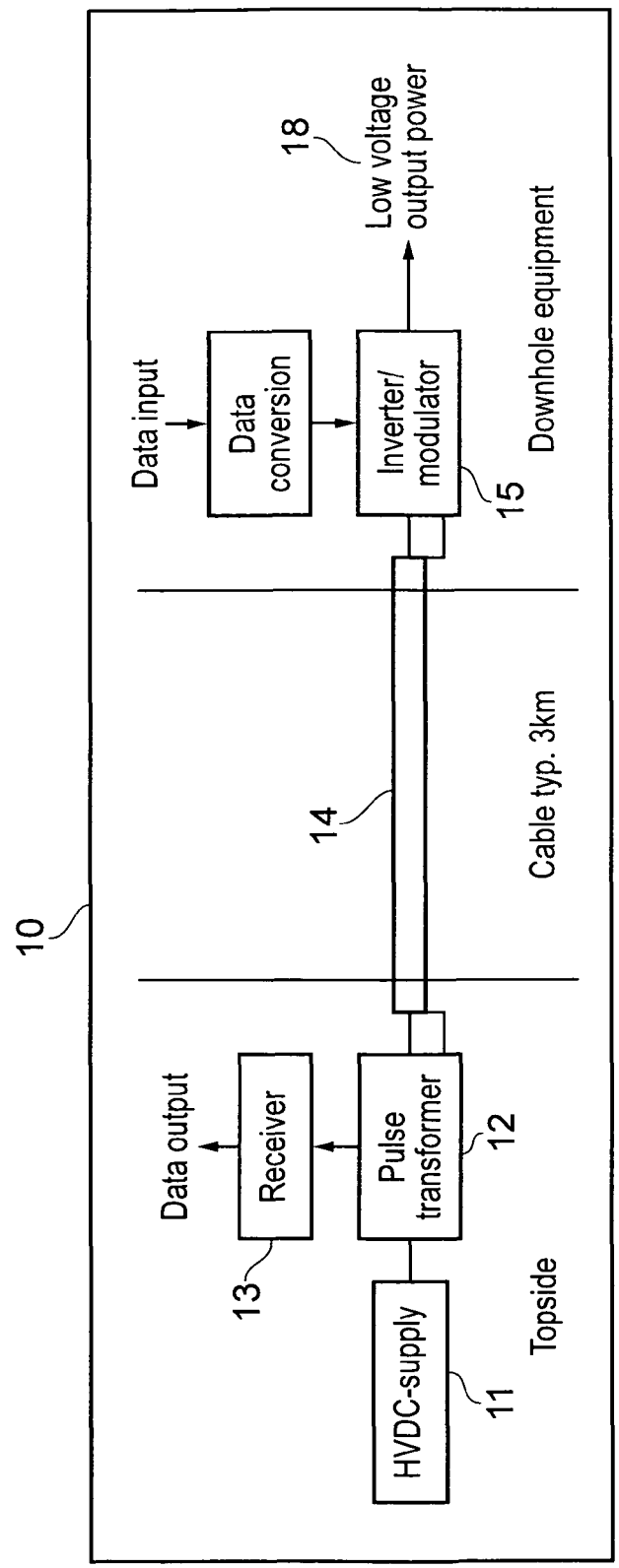
FIG. 1 shows a block diagram of the principle of the system according to one or more embodiments of the present invention.

FIG. 1 shows a block diagram of a system 10 according to one or more embodiments of the invention.

A power source, in this case a high voltage DC power supply (HVDC) 11 is provided at the top side of a petroleum well. The HVDC is connected to a power line, the cable 14, leading down into the well to equipment/tools located downhole (not shown). Downhole the cable 14 is connected to a switch mode transformer/inverter 15 for converting/transforming the high voltage power to a lower voltage 18 which may be used by the downhole equipment. The switch mode inverter 15 is connected to or comprises modulating means for modulating the switching based on the data to be communicated. In this example the modulating means are integrated in the switch mode inverter 15 and are bi-phase modulation means. Data from equipment downhole that may be communicated to the top side are for example; logging data, status of the equipment such as temperature, mode of operation, any failure states/alarm signals, etc. The data are input to the modulating means which modulate the switch mode inverter according to the data to be transferred.

The switching action of the DC/DC transformer causes a ripple current to propagate along the cable 14. The modulation of the switch mode inverter causes a modulation of the ripple current which propagates through the cable and can be received by a (pulse) receiver 13. In this embodiment a pulse transformer 12 is arranged between the cable 14 and the receiver 13. The receiver 13 demodulates the signal and output the demodulated signal.

Figure 2:
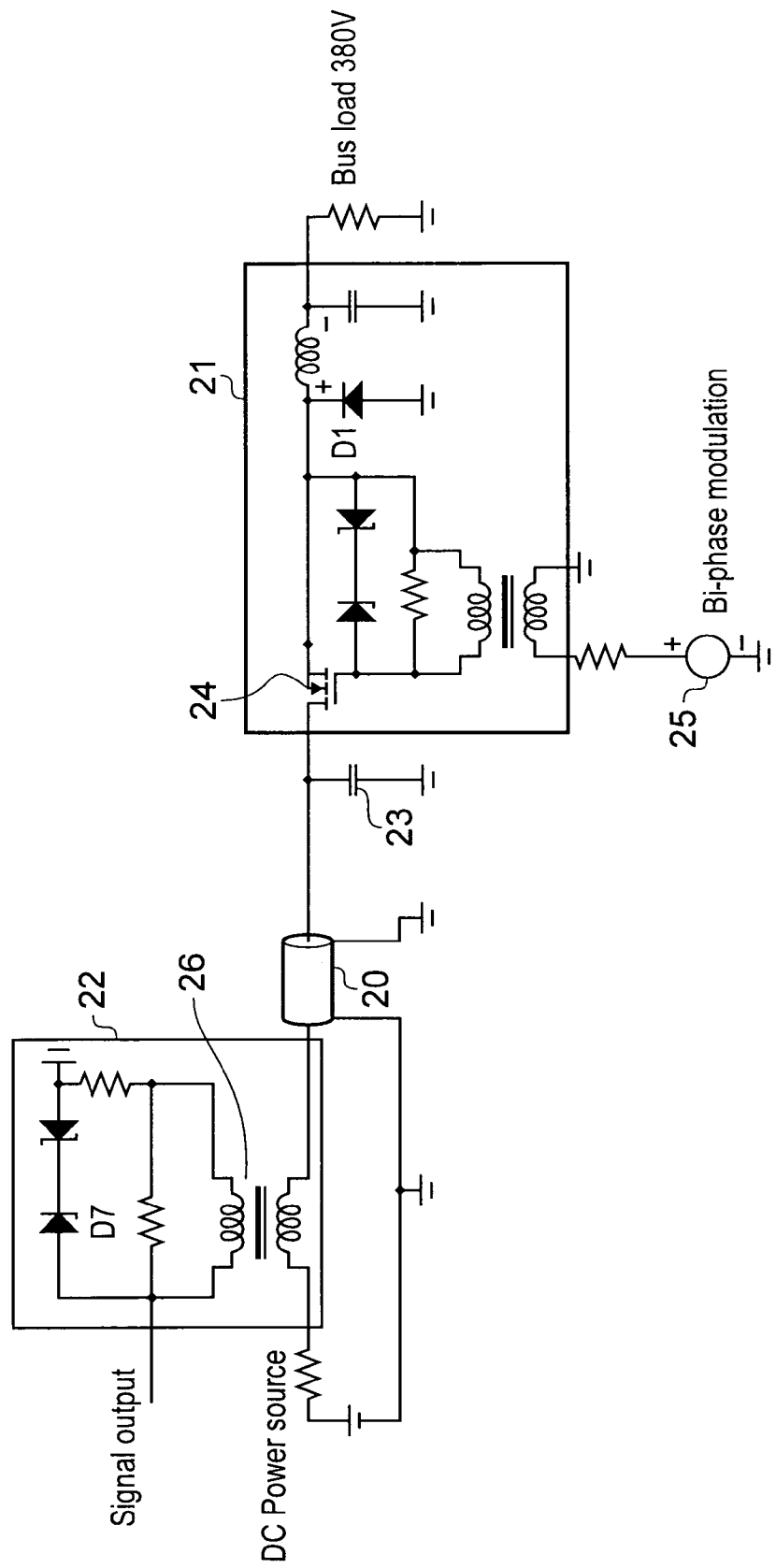
FIG. 2 shows one or more embodiments of the present invention with more details.

FIG. 2 shows one or more embodiments of the present invention with more details. The power cable 20 is typically a high capacitance coaxial cable with low impedance. It is fed with high voltage DC via a pulse transformer 25 being a part of the receiver 22 located topside.

Downhole the cable 20 feeds power to the switch mode inverter 21 which transforms the input power to a bus power more suited for feeding motors and other downhole equipment. The inverter 21 comprises a power switch transistor 24, for example a high speed SiC (Silicon carbide) transistor. The switching sequence of the transistor 24 is controlled by a bi-phase modulator 25. A capacitor 23 reduces the ripple on the line and thus improves the power transfer. The power cable 20 will in itself provide most of the input capacitance needed by the inverter.

Figure 3:
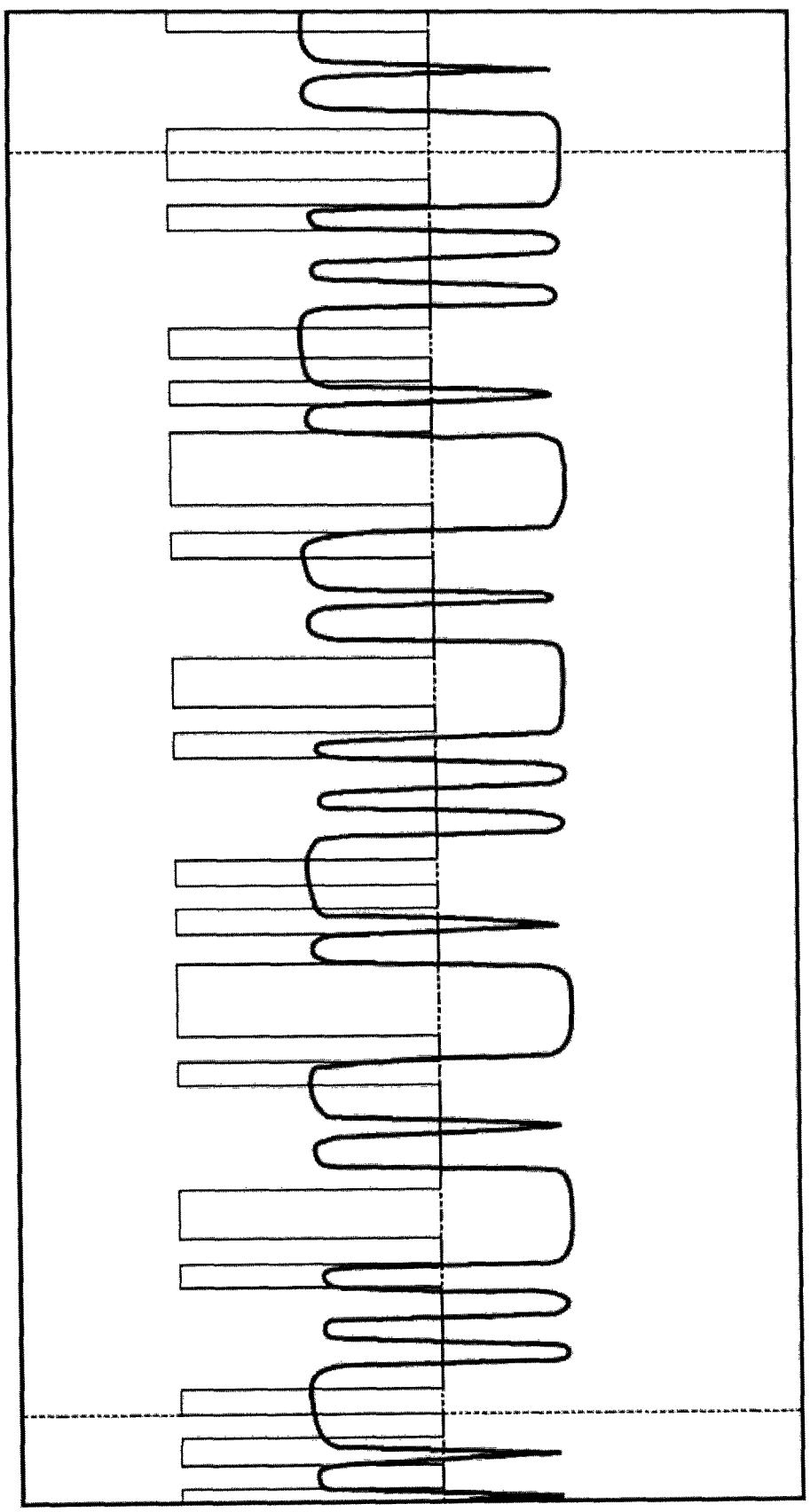
FIG. 3 shows an example of a modulation sequence.

FIG. 3 shows a typical biphase modulation sequence (Manchester coded) and the corresponding ripple signal received at topside. Note the time delay related to the propagation over a 3 km long power transmission cable.

With this modulation technique, having no DC-component, the power output voltage will typically stay close to half of the line input voltage which is well suited for motor designs. A load dependent regulation can be performed at topside based on measurement of the load current and the downhole voltage. If a downhole regulation is wanted, the use of two-tone modulation can be combined with duty factor control of the power output voltage from the inverter.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A system for communicating over a power cable, comprising:
    a power line running through a petroleum well and connected to a high voltage DC power source at one end,
    a switch mode transformer connected to the power line at another end for transforming voltage received from the high voltage DC power source through the power line, the switch mode transformer comprising a power switch transistor,
    a bi-phase modulator controlling a switching sequence of the power switch transistor based on data to be communicated, and
    a receiver arranged at the end connected to the high voltage DC power source, wherein the receiver is adapted to detect and process ripple signals from the switch mode transformer propagated on the power line.

2. The system according to claim 1,
wherein cable capacitance provides input capacitance of the switch mode transformer.

3. The system according to claim 1,
wherein the power cable reaches from over ground into underground, wherein the high voltage DC power source and the receiver are located top-side, and wherein the switch mode transformer is located down hole.

4. The system according to claim 1,
wherein the switch mode transformer comprises silicon carbide transistors.

5. The system according to claim 1,
wherein fast switching is used in order to improve data transfer rate.

6. The system according to claim 1,
wherein filters are arranged in connection with the switch mode transformer or the receiver in order to improve signal characteristics and reduce power loss in the cable.

* * * * *

UNITED STATES PATENT AND TRADEMARK OFFICE
CERTIFICATE OF CORRECTION

| | | |
|---|---|---|
| PATENT NO. | : 8,842,744 B2 | Page 1 of 1 |
| APPLICATION NO. | : 13/502443 | |
| DATED | : September 23, 2014 | |
| INVENTOR(S) | : Truls Fallet | |

It is certified that error appears in the above-identified patent and that said Letters Patent is hereby corrected as shown below:

On the title page insert item (30), foreign priority application data, --Norway 20093173-- dated --October 19, 2009,--

Signed and Sealed this
Twenty-fourth Day of March, 2015

Michelle K. Lee
*Director of the United States Patent and Trademark Office*